March 27, 1951 W. B. WOODRING ET AL 2,546,379
DRY CELL AND METHOD OF MAKING SAME
Filed April 15, 1947 2 Sheets-Sheet 1
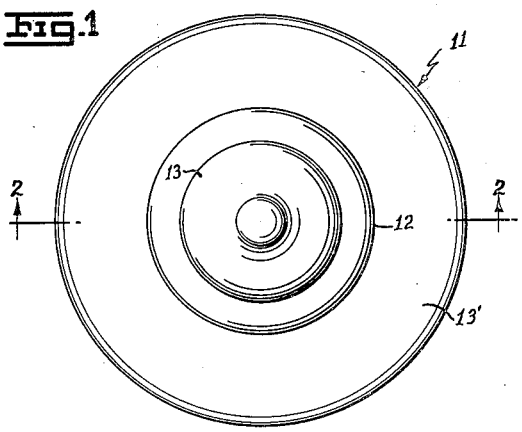
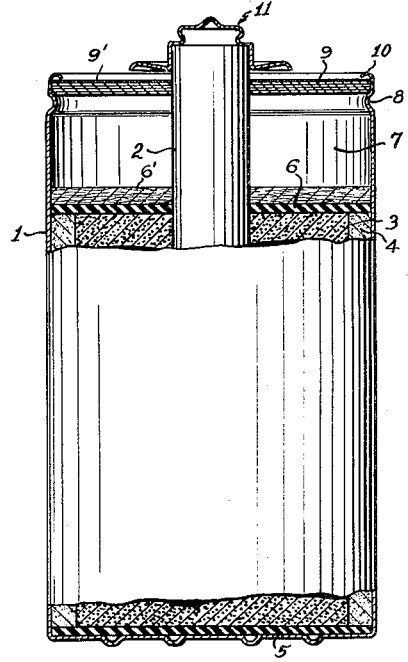
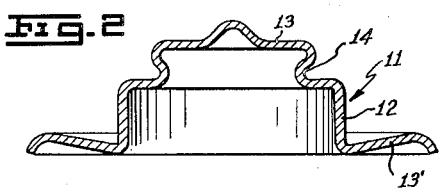
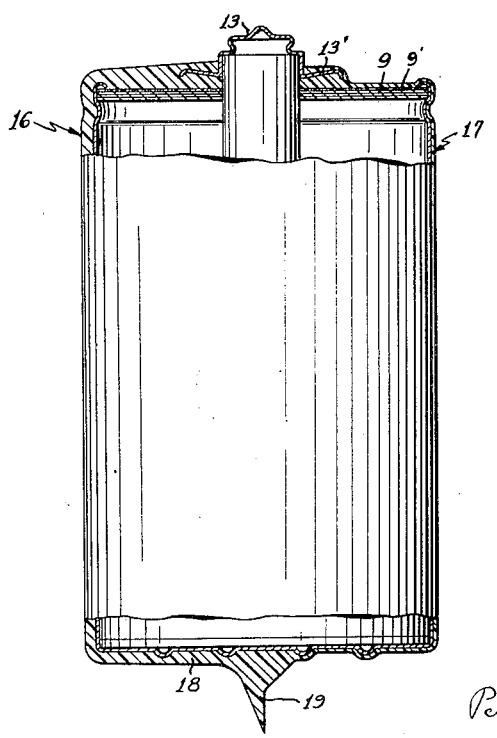
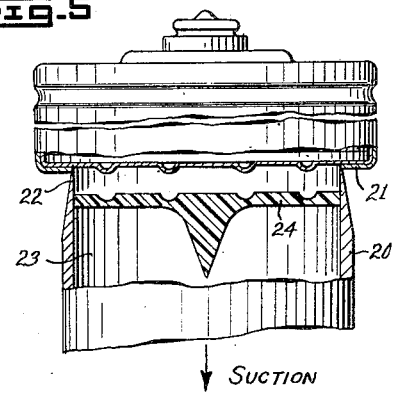
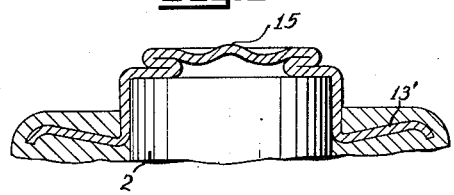
INVENTORS
W. B. Woodring
O. K. Reinhardt
BY
Pennie, Edmonds, Morton & Barrows
ATTORNEYS March 27, 1951 W. B. WOODRING ET AL 2,546,379
DRY CELL AND METHOD OF MAKING SAME
Filed April 15, 1947 2 Sheets-Sheet 2

INVENTORS
W. B. Woodring
O. K. Reinhardt
BY
Pennie, Edmonds, Morton & Barrows
ATTORNEYS Patented Mar. 27, 1951

2,546,379

UNITED STATES PATENT OFFICE 2,546,379

DRY CELL AND METHOD OF MAKING SAME

William B. Woodring and Otto K. Reinhardt, New Haven, Conn., assignors to Olin Industries, Inc., New Haven, Conn., a corporation of Delaware Application April 15, 1947, Serial No. 741,530

6 Claims. (Cl. 136—133)

This invention relates to dry cells and more particularly to an improved leak-resistant cell.

In the usual construction of dry cells, the outer container is a zinc can which forms one of the electrodes of the cell. In the use of the cell, the zinc is consumed and, if there are any irregularities in the zinc wall structure, it may be entirely consumed in one or more areas before the cell becomes exhausted. This permits the electrolyte mixture to leak from the cell and corrode the metallic parts of the flashlight casing in which the cells are used.

A further cause of leakage in cells of ordinary construction is the pressures created in the cell when it is short-circuited or under heavy load for a considerable period of time. The gases thus formed create pressure in the cell and force the paste-like electrolyte mixture from the top of the cell around the edge of the zinc can and around the central opening through which the carbon electrode extends, if the closure is of such type that leakage may occur.

It has been proposed to form a leak-resistant cell by placing an outer steel jacket over the cell and tightly crimping the upper and lower edges of the jacket to the upper and lower edges of the zinc can. While such construction is satisfactory for preventing leakage through the side wall of the cell when the zinc has been partially consumed, it does not prevent leakage at joints caused by electrolyte being forced from the cell due to pressures created by the formation of gas within the cell. Such construction depends entirely upon the efficiency of the ordinary cell closure to prevent this latter type of leakage.

It has also been proposed to form a leak-resistant cell by placing an outer plastic jacket around the side, a portion of the bottom, and the top of a conventional dry cell. Such proposals have included the use of preformed jackets of plastic material and the extrusion of a jacket of asphaltic material around the cell.

In the present invention we provide a leak-resistant cell in which a plastic jacket or casing is formed on the cell by dipping the completed cell into a gel lacquer and after the coating has set, removing a portion of it from the central part of the bottom of the zinc can to expose the zinc electrode and permit the cell to be used in the usual tandem arrangement in a flashlight casing.

This produces a cell encased in a smooth, shrink-fit jacket of tough plastic, which is under tension, with the top surface of the metal contact cap forming the cathode connection and the central area of the bottom of the zinc can, forming the anode connection, exposed.

An important feature of the invention, as applied to dry cells, is that when a coating of gel lacquer is applied and then allowed to dry, the removal of the solvent causes shrinkage, placing the jacket under tension. The jacket, after removal of the excess material from the bottom of the zinc can extends over a slight area of the can adjacent its outer edge. While the plastic formed from the gel lacquer has very little adhesion for zinc, the shrinkage of the jacket on drying results in a tight seal, and therefore, leakproofness, and no sealing cement is required.

In the accompanying drawings we have shown several embodiments of the invention. In this showing:

Fig. 1 is a view of a contact cap employed provided with means for being received in a clamp to permit the cell to be dipped in the gel lacquer, the cap being shown on an enlarged scale;

Fig. 2 is a vertical, sectional view on line 2—2 of Fig. 1;

Fig. 3 is an elevation, partly in section, showing the construction of the cell prior to the application of the coating;

Fig. 4 is an elevation, partly in section, showing the cell after removal from the gel lacquer bath, half to the left illustrating the lacquer coating before drying, and half to the right, illustrating the coating after drying;

Fig. 5 is a side elevation illustrating the removal of the coating, and the "tail," from the bottom of the can;

Fig. 6 is a detailed view of the upper end of the central electrode of the cell showing the contact cap flattened to produce a cell of normal height;

Figure 7:
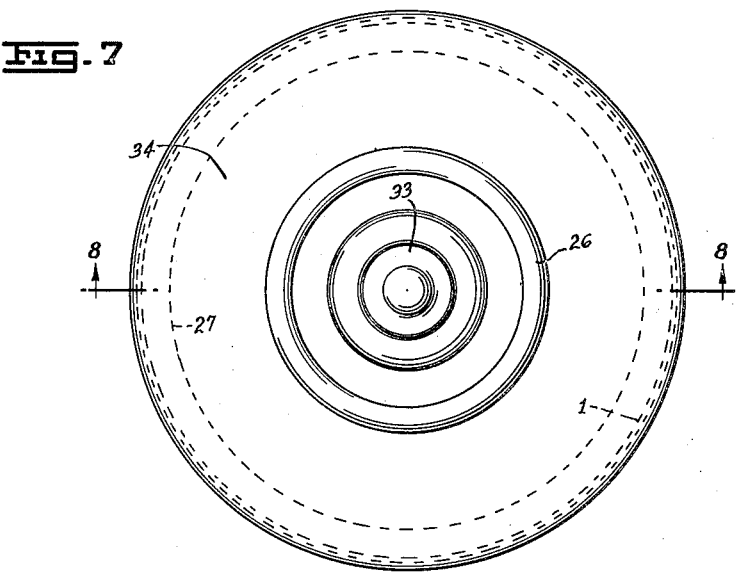
Fig. 7 is a top plan view of another form of the invention.

Referring to Figs. 1 to 6 of the drawings, the reference numeral 1 designates the zinc can of a dry cell which is of conventional construction in which is arranged a carbon pencil 2 preferably disposed centrally thereof as is conventional in the construction of dry cells, the zinc and carbon forming the two electrodes of the cell.

The carbon electrode is surrounded by the usual core 3 of the depolarizing material, which is slightly spaced from the zinc can as shown and the electrolyte paste 4 is placed between the depolarizing mix and the zinc electrode as is the conventional practice. An insulating washer 5 is arranged in the bottom of the zinc can and a waterproof washer 6 is arranged above the depolarizing mix. A layer 6' of stiff petrolatum is placed over this washer. This provides an air space 7 adjacent the top of the can and above this space we provide a groove 8 on the exterior of the can forming an internal bead to support a paper washer 9. The edge of the can is crimped over this washer as indicated at 10. It will be noted that in this form of the invention no cell closure other than the paper washer 9 and the lacquer coating is employed.

The end of the carbon electrode 2 projects slightly from the top of the cell, as is the usual practice, and receives a metal contact cap 11. This cap is provided with a cylindrical portion 12 to snugly embrace the end of the electrode and with a skirt or flange 13' extending from its lower edge, which is embedded in the material of the coating or jacket. Ordinarily the cylindrical portion 12 of the contact cap is provided with a flat top but in order to permit dipping of the cell into the solution of gel lacquer and substantially completely covering it with the coating material, we provide a projecting portion 13, preferably having a groove 14, to be engaged by a suitable clamp when the cell is to be dipped into the lacquer solution.

The projection 13 increases the height of the cell and, in order to produce a cell of standard size that can be used in flashlight casings and in other places where provision is made for the reception of flashlight cells, this cap is flattened as indicated at 15 in Fig. 6 of the drawings after the cell has been completed.

To form the cell coating or jacket, the cell, as shown in Fig. 3 of the drawings, is engaged by a clamp and lowered into a solution of a gel lacquer. We may employ a solution of the material known as Tenite II which comprises a plasticized cellulose acetate butyrate. A suitable solvent for the present purposes is a mixture of 20 percent isopropyl alcohol and 80 percent xylene. The powdered Tenite is added to the solvent mixture in amount producing a solution containing approximately 20 percent solids. The solution is rather viscous, having a viscosity of about 2000 centipoises at a temperature of 120° F., which is the approximate temperature employed in the dipping operation. This lacquer and other similar lacquers have the property of setting in a gel sufficiently firm that the lacquer will not flow when brought to approximately room temperature. It permits dip coating with the formation of much thicker films than can be obtained with conventional coating lacquers. A dry film thickness up to .010" can be readily obtained and, with proper precautions, a thicker layer can be obtained in a single dip.

The cell is dipped into the lacquer solution and then slowly withdrawn, the rate of withdrawal being more rapid at first. It is allowed to stand exposed to room temperature for a period of about 5 minutes. During this time the lacquer gels by cooling and some solvent evaporates. In Fig. 4 of the drawings we have illustrated the cell with the lacquer coating applied. The reference numeral 16 designates the comparative thickness of the coating immediately after withdrawal from the lacquer solution and the reference numeral 17 indicates the relative thickness of the coating after evaporation of the solvent. As shown, the coating extends over the side walls of the zinc can, over the bottom of the cell, as indicated at 18, and forms a "tail" 19. The cell is dipped to a point where the plastic jacket extends over the top of it, the skirt 13' of the contact cap being embedded in the jacket as shown in Fig. 4 of the drawings. Thus, in the form of the invention shown in Figs. 1 to 6 of the drawings, aside from the paper washer 9, the plastic jacket forms the top closure of the cell and is relied upon to provide adequate resistance to leakage.

During the process of dipping the cell in gel lacquer, it is warmed by the lacquer, which is at a higher temperature than the cell. The increase in temperature of the cell causes air within the cell to expand, and escape through the top paper washer, the junction of the paper washer and the cell, or the junction of the paper washer and the carbon electrode. The escaping air will cause bubbles to form in the coating of gel lacquer on top of the paper washer. If the cell is held suspended in the solvent vapors above the gel lacquer, but maintained at the temperature of the gel lacquer, the bubbles will break and "heal." We prefer, however, to seal the top paper washer so that air does not escape from the cell during the slight pressure rise which occurs on dipping.

For this purpose a sealing material 9' may be applied to the paper washer 9, extending completely over the surface from the cell edges to the carbon electrode and wetting both the zinc and the carbon. While the sealing material is still liquid, we prefer to seat the cap on the carbon electrode so that the under surface of the cap is wet by the sealing material. Upon drying of the seal, a substantially air-tight closure, in so far as the rise in air pressure during dipping is concerned, results. Also the underside of the cap is protected from corrosion by the sealing material. We consider it important to use a sealing material to which the gel lacquer adheres tightly so that the top seal is essentially an integral and continuous part of the plastic coating. This sealing material is sufficiently high in solids that small openings between the zinc can and the paper washer are securely sealed after the sealing material dries. One example consists of a mixture of a nitrocellulose lacquer with a blend of plasticized cellulose acetate-butyrate and a polyvinyl chloride composition containing sodium polysulphide and titanium dioxide pigment.

Heretofore in coating articles by dipping, it has been the practice to rotate the coated article when the excess lacquer is drained from it to eliminate the formation of the "tail" 19. In the coating of a dry cell, and in the coating of other articles, where a portion of the article is to be exposed, we eliminate this rotation and permit the "tail" 19 to form. The removal of the "tail" is effected by a suitable knife 20 (see Fig. 5). As shown, the knife is in the form of a cylinder of such diameter that it removes the coating from most of the bottom of the can leaving a flange 21 on the bottom of the jacket at the edge of the can. The knife is provided with a suitable cutting edge 22 which is brought into contact with the bottom of the can and then rotated in any suitable manner. The interior 23 of the knife is connected to a suitable source of suction which conveys the removed portion 24 of the coating and permits its re-use in the forming of further lacquer solution.

After cleaning the can bottom, the cell may be removed from the clamp and air dried for about 24 hours. During this time the lacquer shrinks tightly around the cell forming a leakproof closure. It has very little adhesion to the zinc but the provision of the flange 21 causes a shrink-fit to the cell and what might be called a mechanical seal.

Figure 8:
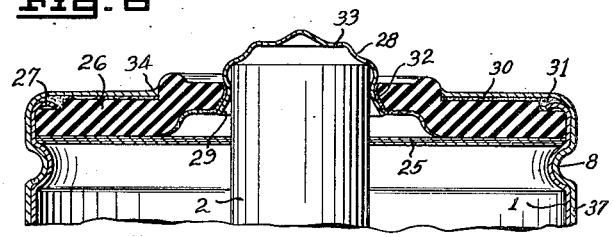
Fig. 8 is a vertical, sectional view of the upper end of the cell shown in Fig. 7.
Figure 9:
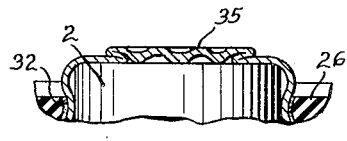
Fig. 9 is a detailed view of the central electrode of the cell shown in Figs. 7 and 8 with the contact cap flattened.

The construction of the cell shown in Figs. 7 to 9 of the drawings is generally similar to that shown in Figs. 1 to 6, and like parts are designated by the same reference numerals. In this form of the invention we have illustrated the application of the gel lacquer jacket to a cell provided with a molded upper closure. A paper washer 25 is placed on the internal bead formed by the groove 8 and a closure member 26 of any suitable molded, non-conducting material is placed over it. The closure member is of a diameter substantially equal to the diameter of the cell and the upper edge of the cell is turned over the edge of the closure member as indicated at 27. The closure member is provided with a central opening to receive the contact cap 28, which surrounds the central electrode and is also shaped to receive the flange or skirt 29 of the contact cap.

Because of the lack of adhesion between the materials from which the molded closure disc 26 is generally made and the plastic formed by the gel lacquer, it is necessary to provide a layer of cement between the top of the closure disc and the jacket, as indicated at 30 in Fig. 8 of the drawings. This cement fills the space between the curved upper edge 27 of the can and the closure disc as indicated at 31. A layer of cement is also placed on the opening in the closure disc, between it and the contact cap as indicated at 32.

The contact cap is provided with a projection 33 which may be of the same form as shown at 13 in Figs. 1 to 6 of the drawings, or of a slightly different shape as illustrated, by means of which the cell is placed in a clamp to permit the cell to be dipped into the lacquer solution to a point where the lacquer coating 37 will extend over substantially all of the closure disc as indicated at 34. After dipping, the cap may be flattened as shown at 35 in Fig. 9 of the drawings.

This type of cell may also be coated by partial immersion horizontally and rotating, the rotation being continued after withdrawal from the lacquer until the coating gels.

It will be apparent from the foregoing description that the process produces a leak-resistant cell with a plastic jacket much simpler than any of the previously known methods. The use of a gel lacquer enables the production of a jacket by an ordinary dipping process of greater thickness than has heretofore been possible by dipping processes and produces a smooth shrink-fit jacket which is tough and which is of sufficient body to form a leak-resistant jacket. The shrinking of the plastic in drying, with a part of the jacket extending over the top of the cell and a part of it extending over the bottom of the cell provides a mechanical seal and eliminates the necessity of the use of sealing compositions or adhesives.

In either of the forms of the invention, the metal contact cap may be provided with a vent, if desired.

As heretofore described, the disclosure and the claims of this application are directed to a leak-resistant cell comprising a zinc can which forms one of the electrodes of the cell in which the exterior of the cell is covered with a leakproof jacket formed from a gel lacquer.

In the copending application of Carl J. Krachenfels, Serial No. 750,962, filed May 28, 1947, now Patent No. 2,519,052, issued August 15, 1950, there is disclosed and claimed a flat battery in which the casing is formed of gel lacquer.

The application of Otto K. Reinhardt, Serial No. 751,041, filed May 28, 1947, now Patent No. 2,519,053, issued August 15, 1950, discloses an improvement over the battery of the Krachenfels application wherein the partition member which extends between each pair of cells is made in one continuous sheet with properly spaced openings to permit the anode of one cell and the cathode of another cell to be connected to each other.

Likewise, the application of William B. Woodring, Serial No. 750,955, filed May 28, 1947, now Patent No. 2,519,054, issued August 15, 1950, discloses a further improvement on the battery of the Krachenfels application in that the partition member bteween adjacent cells is made conductive and serves the combined function of a partition member and a cathode.

We claim:

1. A leak-resistant battery cell having top and bottom terminals, comprising a metal can forming one of the electrodes and furnishing the bottom terminal of the cell, a closure for the upper end of the can, a top terminal for the cell projecting exteriorly beyond the said closure, and a taut jacket formed from a gel lacquer covering the side walls, a circumferential portion of the bottom and the entire closure of the cell leaving the top and bottom cell terminals exposed, the jacket being adhered to the said closure but having substantially no adhesion to the metal can and providing a mechanical seal by shrinkage at the bottom of the cell.

2. A leak-resistant battery cell having top and bottom terminals, comprising a metal can forming one of the electrodes of the cell, a central electrode projecting from the metal can, a contact cap constituting the top terminal arranged on the central electrode, a closure for the upper end of the metal can, and a taut jacket formed from a gel lacquer covering the side walls, a circumferential portion of the bottom and the entire top closure of the cell leaving the top and bottom cell terminals exposed, the said jacket being adhered to the said closure but having substantially no adhesion to the metal can and forming a mechanical seal by shrinkage at the bottom edge of the cell.

3. A leak-resistant battery cell having top and bottom terminals, comprising a zinc can forming one of the electrodes and furnishing the bottom terminal of the cell, a closure for the upper end of the can, a top terminal for the cell projecting exteriorly beyond the said closure, and a taut jacket formed from a gel lacquer covering the side walls, a circumferential portion of the bottom and the entire closure of the cell leaving the top and bottom cell terminals exposed, the jacket being adhered to the said closure but having substantially no adhesion to the zinc can, and providing a mechanical seal by shrinkage at the bottom of the cell.

4. The method of making a leak-resistant cell which comprises dipping a cell comprising a metal can and a central electrode provided with a contact cap into a gel lacquer to completely envelop the whole cell except a portion of the top including the contact cap, the gel lacquer being maintained at an elevated temperature above the temperature at which the lacquer gels, removing the cell from the lacquer and allowing it to stand at a lower temperature at which the lacquer gels until gelation occurs, thereafter, while the coating is still in gel form, cutting a portion of the coating from the center portion of the bottom of the cell to expose the bottom cell terminal and provide a bottom circumferential flange, and then permitting the coating to dry and shrink to provide a coating extending over the top, side walls and a circumferential portion of the bottom of the cell, and form a mechanical seal to prevent leakage of the cell.

5. The method of making a leak-resistant cell which comprises dipping a cell comprising a zinc can and a central electrode provided with a contact cap into a gel lacquer to completely envelop the whole cell except a portion of the top including the contact cap, the gel lacquer being maintained at an elevated temperature above the temperature at which the lacquer gels, removing the cell from the lacquer and allowing it to stand at a lower temperature at which the lacquer gels with the cell supported from the top whereby drainage causes the formation of a "tail" on the bottom of the cell, permitting the lacquer to gel while maintained at such temperature, thereafter while the coating is still in gel form, cutting the portion of the coating including the "tail" from the bottom of the cell to expose a bottom cell terminal and provide a bottom circumferential flange, and then permitting the coating to dry and shrink to provide a coating extending over the top, side walls and a circumferential portion of the bottom of the cell and form a mechanical seal to prevent leakage of the cell.

6. The method of making a leak-resistant cell which comprises grasping a cell comprising a zinc can and a central electrode provided with a contact cap by the contact cap, dipping the cell into a gel lacquer to completely envelop the whole cell except a portion of the top including the contact cap, the gel lacquer being maintained at an elevated temperature above the temperature at which the lacquer gels, removing the cell from the lacquer, and while still supporting it from the contact, allowing it to stand at a lower temperature at which the lacquer gels until gelation occurs, thereafter, while the coating is still in gel form, cutting a portion of the coating from the center of the bottom of the cell to expose a bottom cell terminal and provide a bottom circumferential flange, and then permitting the coating to dry and shrink to provide a coating extending over the top, side walls and a circumferential portion of the bottom of the cell and form a mechanical seal to prevent leakage of the cell.

WILLIAM B. WOODRING.
OTTO K. REINHARDT.

REFERENCES CITED

The following references are of record in the file of this patent:

UNITED STATES PATENTS

| Number | Name | Date |
|---|---|---|
| 1,277,147 | St. Armande | Aug. 27, 1918 |
| 1,515,945 | French | Nov. 18, 1924 |
| 1,606,456 | Teetsal | Nov. 9, 1926 |
| 1,821,008 | Dittrick et al. | Sept. 1, 1931 |
| 2,276,685 | Bright | Mar. 17, 1942 |
| 2,346,640 | Anthony | Apr. 18, 1944 |
| 2,350,744 | Fordyce | June 6, 1944 |
| 2,444,616 | Rock | July 6, 1948 |

FOREIGN PATENTS

| Number | Country | Date |
|---|---|---|
| 438,663 | Great Britain | Nov. 18, 1935 |
| 471,425 | Great Britain | Sept. 3, 1937 |

OTHER REFERENCES

Hamer, W. J., Trans. Electrochemical Society, vol. 90 (1946), pages 449, 465.